US005113206A

United States Patent [19]

Fukazawa

[11] Patent Number: 5,113,206

[45] Date of Patent: May 12, 1992

[54] INK TANK AND INK JET RECORDING APPARATUS HAVING THE INK TANK

[75] Inventor: Hideo Fukazawa, Yokohama, Japan

[73] Assignee: Canon Kabushiki Kaisha, Tokyo, Japan

[21] Appl. No.: 563,933

[22] Filed: Aug. 7, 1990

Related U.S. Application Data

[63] Continuation of Ser. No. 291,736, Dec. 29, 1989, abandoned.

[30] Foreign Application Priority Data

Dec. 29, 1987 [JP] Japan ................................ 62-335362
Dec. 26, 1988 [JP] Japan ................................ 63-326068

[51] Int. Cl.[5] ................................ B01D 15/18
[52] U.S. Cl. ................................ 346/140 R; 346/75
[58] Field of Search ................................ 346/75, 140 R

[56] References Cited

U.S. PATENT DOCUMENTS 4,024,548 5/1977 Alonso et al. ................ 346/140 R
4,422,084 12/1983 Saito ................................ 346/140 R
4,524,365 6/1985 Kakeno et al. ........................ 346/75
4,604,633 8/1986 Kimura et al. ................ 346/140 R

FOREIGN PATENT DOCUMENTS 3708865 10/1987 Fed. Rep. of Germany .
60-44352 3/1985 Japan .
60-90767 5/1985 Japan .
60-151055 8/1985 Japan .
60-189455 9/1985 Japan .

*Primary Examiner*—Benjamin R. Fuller
*Assistant Examiner*—Gerald E. Preston
*Attorney, Agent, or Firm*—Fitzpatrick, Cella, Harper & Scinto

[57] ABSTRACT

A waste ink tank for containing waste ink in an ink jet recording apparatus comprising an opening provided in the waste ink tank, for introducing the waste ink into the ink tank, an ink absorbing member disposed in the waste ink tank, and a volume expanding member arranged in contact with a predetermined position of the ink absorbing member, the volume expanding member expanding due to absorption of ink and having a coefficient of volumetric expansion higher than that of the ink absorbing member.

43 Claims, 7 Drawing Sheets

INK TANK AND INK JET RECORDING APPARATUS HAVING THE INK TANK

This application is a continuation of application Ser. No. 07/291,736 filed Dec. 29, 1989, now abandoned.

BACKGROUND OF THE INVENTION

1. Field of the Invention

This invention relates to an ink jet recording apparatus, and more particularly, it relates to an ink jet recording apparatus having a mechanism for detecting an amount of ink in an ink tank in which ink is stored.

2. Related Background Art

First of all, a conventional ink jet recording head of a kind having an ink tank used as an exhaust ink tank will be explained. In the conventional ink jet recording apparatus of this kind, ink discharging openings of recording heads would be clogged or jammed due to increase of viscosity of ink in the unused or rarely used recording head or heads and/or adhesion of dust in the discharge openings of the head. In order to remove such viscous ink and the like from the recording heads, various head restoring mechanisms have been used. For example, such head restoring mechanisms comprise means for discharging the viscous ink from the related discharge opening of the recording head by pressurizing the ink in the head or means for removing the viscous ink from the related discharge opening by sucking the ink through the medium of a cap for covering the discharge openings to protect them. The exhaust ink including the removed viscous ink was reserved in a predetermined exhaust ink tank.

FIG. 1 shows an example of the conventional ink jet recording apparatus having such head restoring mechanism, as a perspective view.

In FIG. 1, a waste or exhaust ink tank 1 formed integrally with ink cartridges 2 for containing colored ink such as cyan ink, magenta ink, yellow ink and black ink, respectively is mounted in a carriage 3. A recording head 5 and a printed circuit board 6 are also mounted on the carriage 3.

The carriage 3 can be shifted along two slide shafts 8 by a driving force transmitted to the carriage through a driving belt 9. As the carriage 3 is shifted, the recording head 5 records or prints images on a recording sheet as a recording medium fed onto a platen 7 by discharging ink on a surface of the recording sheet. During the recording operation, the carriage 3 is shifted appropriately or at a predetermined timed relation up to a position where the recording head 5 faces a cap 11. In this position, a head restoring (discharge restoring) operation is performed by means of a discharge restoring apparatus 10.

In the discharge restoring operation, the whole discharge restoring apparatus 12 and a waste ink pipe 12 are protruded into a path of the recording head 5 so that the recording head 5 is capped or covered by the cap 11 (i.e., the discharge openings of the head is covered) and the waste ink pipe 12 is connected to a predetermined portion of the waste ink tank 1. Then, the ink is sucked from the recording head 5 by a pump (described below) arranged in the discharge restoring apparatus 10 and is collected in the waste ink tank 1 through the waste ink pipe 12.

FIG. 2 shows details of the discharge restoring system. The four recording heads 5 corresponding to cyan ink, magenta ink, yellow ink and black ink, respectively are capped or covered by the four corresponding caps 11. The waste ink sucked from the four recording heads 5 by means of a suction pump 101 is combined as a single stream and is sent to the waste ink tank 1 through the waste ink pipe 12.

In this connection, when the waste ink tank is filled with a predetermined amount of ink, such waste ink tank must be replaced by a new empty one; otherwise, if the waste ink is continued to be sent to the filled waste ink tank, the ink will overflow out of the ink tank, thereby smearing or contaminating the electric systems such as the printed circuit board and the like to damage them.

For this reason, various techniques for detecting a predetermined amount of ink collected in the waste ink tank have been proposed.

As an example of such detecting technique having the simplest construction, the waste ink tank was made of transparent material. In this case, the amount of the waste ink collected in the ink tank could be visually checked, thus preventing the overflow of the ink by appropriately replacing the waste ink tank by a new one.

Another technique was to indicate the predetermined amount of ink by detecting the weight of the whole waste ink tank including the waste ink therein. For example, a pair of scales (seesaw type) on one of which the waste ink tank mounted was used. In this case, when the amount of ink in the waste ink tank exceeded a predetermined level, the ink tank was lowered, which condition was detected electrically or physically.

According to another detecting technique, an ink absorbing material which increases its volume by absorbing the ink therein was disposed in the waste ink tank. With this construction, as the waste ink was collected in the waste ink tank, the ink absorbing material swelled or expanded in the ink tank gradually to finally occupy the greater part of the volume of the ink tank, which condition was detected electrically or optically.

However, in the above-mentioned visual detection (use of the transparent material), while the construction is simple, an operator must always monitor or check the amount of ink in the ink tank, and thus, it is extremely inconvenient for the operator who engage the printing operation.

Further, in the above-mentioned weighting detection (use of the seesaw), large space is required to install such weighting detection system, which is contrary to compactness of the ink jet recording apparatus. Further, sensors for detecting the weight of the whole waste ink tank is expensive, making the whole ink jet recording apparatus expensive.

Further, in the above-mentioned use of the ink absorbing material, such ink absorbing material is relatively expensive, and since the ink absorbing material does not necessarily expand uniformly, incorrect detection will occur.

SUMMARY OF THE INVENTION

An object of the present invention is to provide an ink tank and an ink jet recording apparatus which can eliminate the above-mentioned drawbacks and which are compact and inexpensive and which include means for properly detecting an amount of ink.

Another object of the present invention is to provide an ink tank and an ink jet recording apparatus comprising an ink tank for storing ink, an ink absorbing member arranged in the ink tank, a volume expanding member having a high coefficient of volume expansion and arranged at a predetermined position in the ink tank and capable of absorbing ink from the ink absorbing member, and means for detecting change in volume of the volume expanding member.

A further object of the present invention is to provide an ink tank and an ink jet recording apparatus which can very easily detect the fact that a predetermined amount of ink is reached, by detecting change in volume of the volume expanding member.

Another object of the present invention is to provide a waste ink tank and an ink jet recording apparatus which can collect or accommodate waste ink by an amount substantially the same as the maximum amount accepted by the waste ink tank with a compact design, by utilizing the ink tank as the waste ink tank, and can properly detect the amount of ink.

DETAILED DESCRIPTION OF THE PREFERRED EMBODIMENTS

The present invention will now be explained in connection with the accompanying drawings.

It should be noted that the present invention is not limited to embodiments described hereinbelow, but can be embodied as any forms so long as to achieve the above-mentioned objects.

Further, the present invention is preferably adapted to an ink tank, particularly a waste ink tank for storing waste or exhaust ink.

First of all, the present invention will be explained with reference to a first embodiment thereof.

Figure 3:
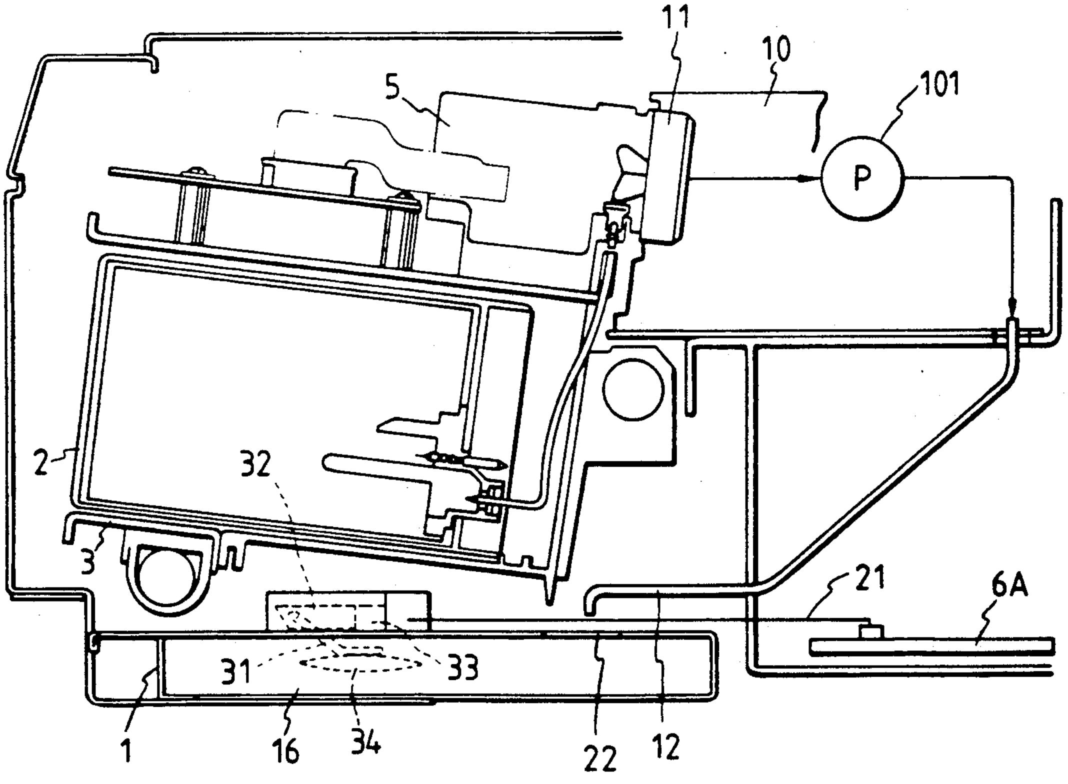
FIG. 3 is a schematic side sectional view of an ink jet recording apparatus according to a preferred embodiment of the present invention.

FIG. 3 shows a side sectional view of an ink jet recording apparatus according to the first embodiment of the present invention. The ink jet recording apparatus shown in FIG. 3 has a similar construction to that shown in FIG. 1, and thus, similar constructural elements will be designated by the same reference numerals, and the detailed explanation thereof is omitted.

Figure 1:
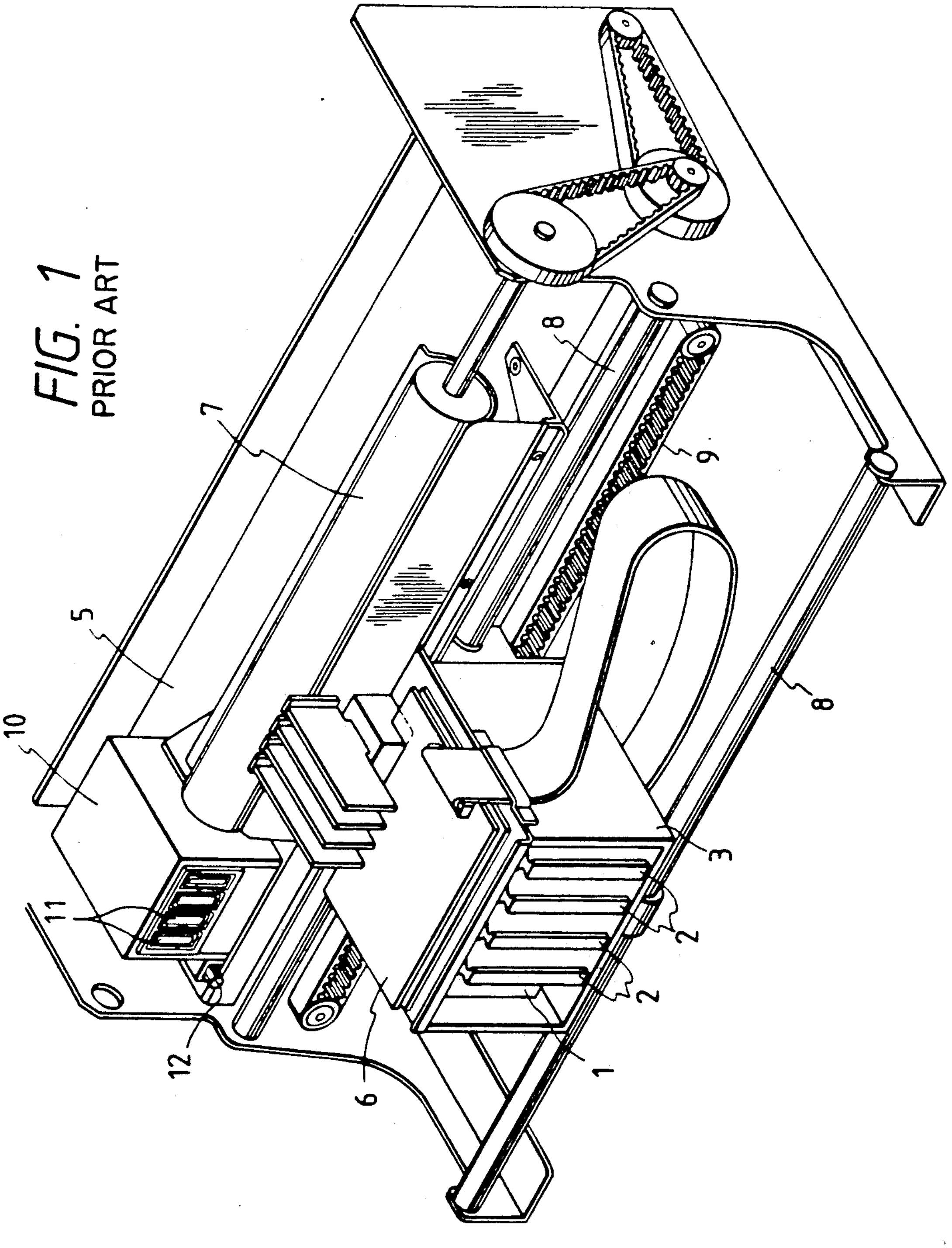
FIG. 1 PRIOR ART
FIG. 1 is a perspective view of an example of a conventional ink jet recording apparatus.
Figure 2:
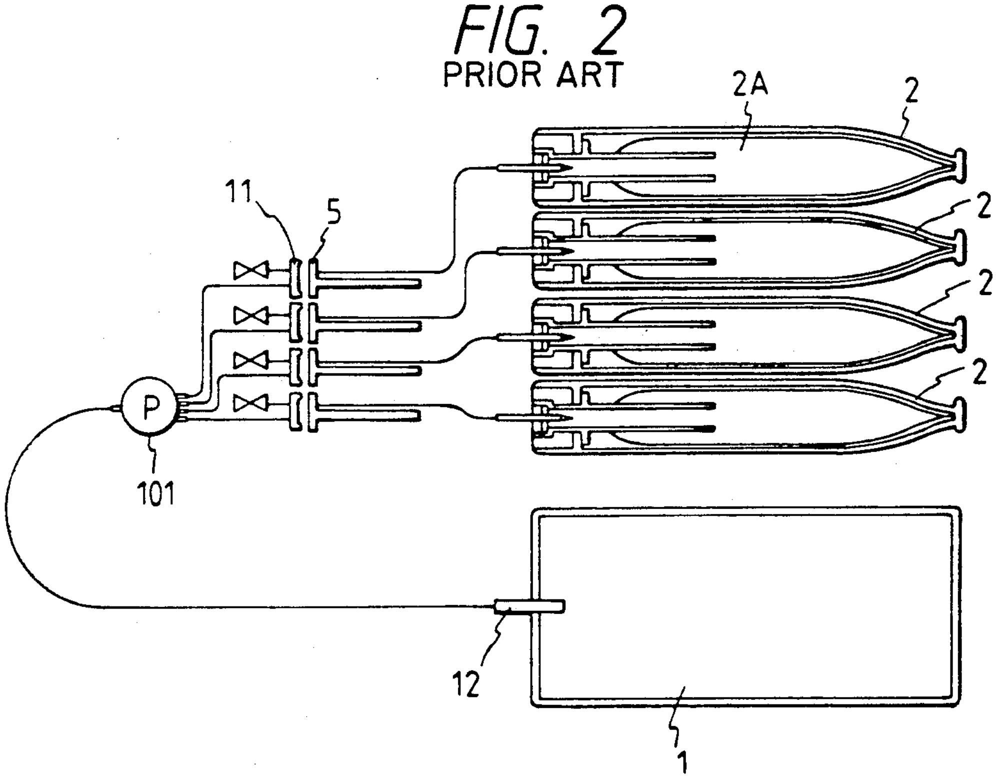
FIG. 2 PRIOR ART
FIG. 2 is a sectional view showing the details of FIG. 1.

The ink jet recording apparatus shown in FIG. 3 mainly differs from that shown in FIG. 1 (conventional apparatus) in the construction of the waste ink tank 1. The waste ink tank shown in FIG. 3 (present invention) is not mounted on the carriage 3, but is positioned on the bottom of the ink jet recording apparatus so that the load on the driving means for driving the carriage 3 can be reduced.

Figure 4:
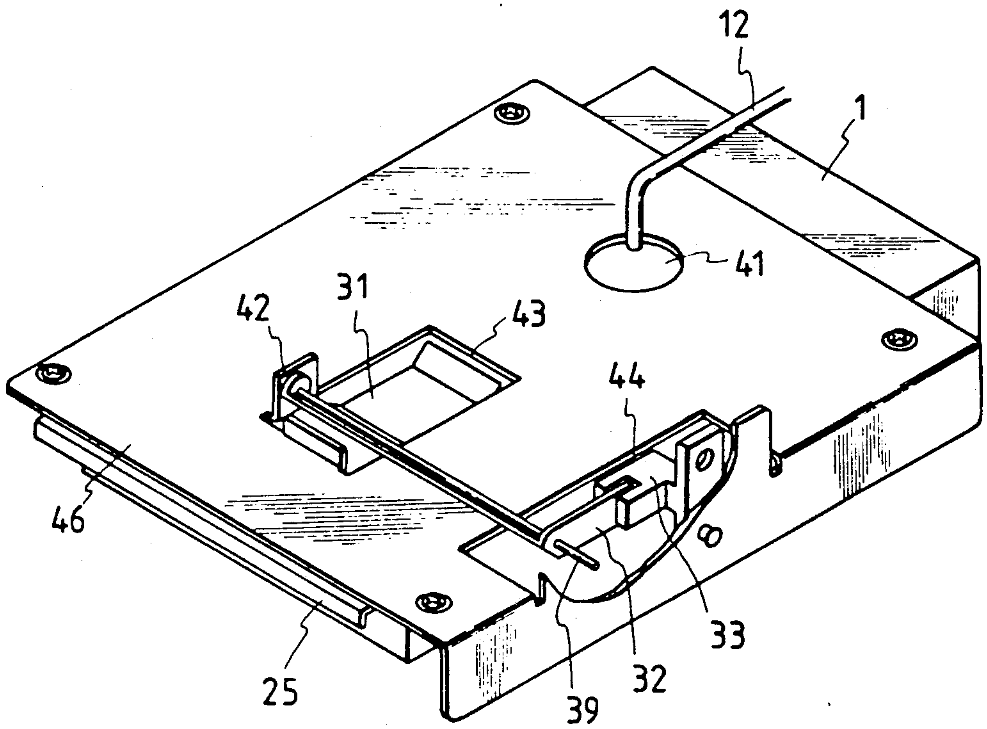
FIG. 4 is a schematic perspective view showing details of a waste ink tank and a detecting mechanism for detecting an amount of ink associated with the ink tank shown in FIG. 3.

FIG. 4 shows a schematic perspective view of the details of the detecting mechanism for detecting an amount of ink associated with the waste ink tank shown in FIG. 3.

In FIG. 3 or FIG. 4, a sensor attaching plate 46 (for holding a sensor) is fixed to a body of the ink jet recording apparatus and has means (not shown) for removably mounting the waste ink tank 1 thereon. The sensor attaching plate 46 includes a hole 41 communicating with an intake opening 22 of the waste ink tank 1, a shaft supporting member 42 for rotatably supporting a hinge pin 39 around which a sensor arm 31 and a photo-arm 32 are rotated, an opening 43 through which the sensor arm 31 can be rocked, and an opening 44 through which the photo-arm 32 can be rocked. Further, a photo-interrupter 33 attached to the sensor attaching plate 46 can engage with the photo-arm 32. A signal from the photo-interrupter 33 is sent to a predetermined circuit (for example, a control circuit) in the printed circuit board 6A provided on the body of the apparatus through a lead wire 21.

Figure 5:
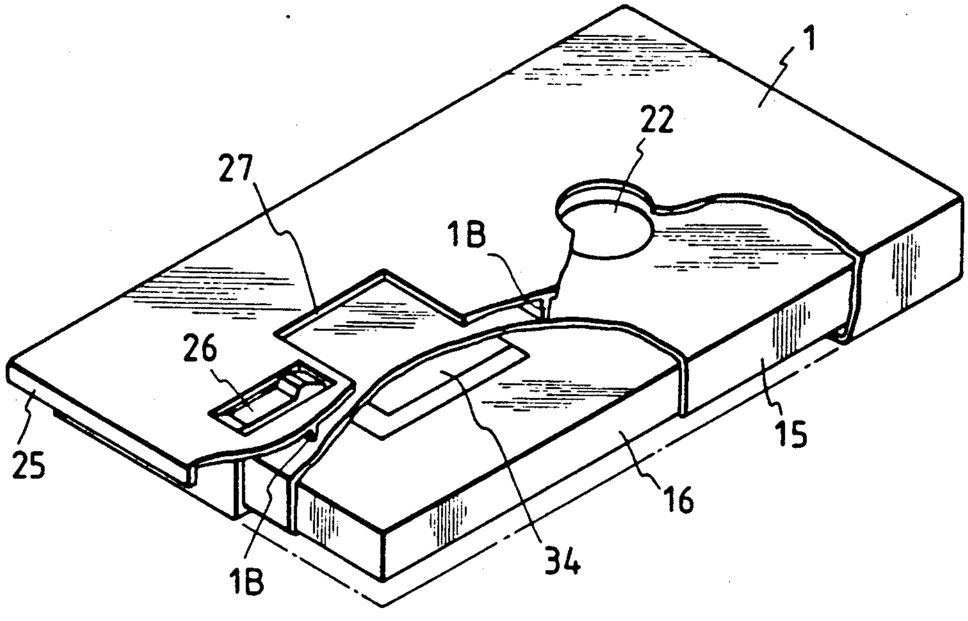
FIG. 5 is a schematic perspective view showing details of a waste ink tank shown in FIG. 3.

FIG. 5 shows a schematic perspective view of the details of the waste ink tank 1 of the present invention shown in FIG. 3 or FIG. 4. The waste ink tank 1 has the afore-mentioned ink intake opening 22 and a detecting window 27 formed therein, and further includes a ratch pawl 26 by which the ink tank is mounted on the sensor attaching plate 46. Further, on an inner surface of the waste ink tank 1, a pair of positioning walls 1B are provided around the detecting window 27, for regulating position and hight of a volume expanding member 34 which will be explained.

A flexible bag 15 positioned in the waste ink tank 1 encloses an ink absorbing member 16 and the above-mentioned volume expanding member 34 attached to a predetermined position of an upper portion of the ink absorbing member 16. Further, a hole complementary to the ink intake opening 22 is formed in the bag 15. The volume expanding member 34 may be comprised of powdered resin having high water-absorbing capacity enveloped by a semipermeable membrane such as a Japanese paper and have the ability of expanding its volume by a few times to a few hundred times, for example. The volume expanding member 34 is attached, by means of a duplicated adhesive tape and the like, to the upper surface of the ink absorbing member 16 in the flexible bag 15 at a position corresponding to the position of the detecting window 27. With this arrangement, when the waste ink is continued to be introduced into the waste ink tank to exceed the preferable ink-absorbing capacity of the ink absorbing member 16, the waste ink is spreaded or smudged onto the upper surface of the ink absorbing member 16 and then is absorbed to the volume expanding member 34. Consequently, the volume expanding member 34 swells or expands due to absorption of the waste ink to finally lift the sensor arm 31.

Next, the ink detecting operation in the waste ink tank by using the above ink detecting mechanism will be explained with reference to FIGS. 6A-6C.

Figure 6A:
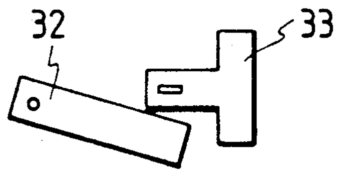
FIGS. 6A-6C are schematic conceptual views showing a photo-interrupter.
Figure 6B:
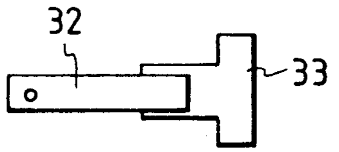
Figure 6C:
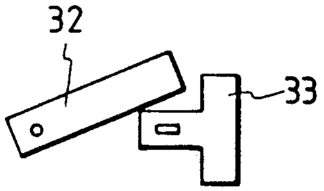

When the waste ink tank 1 is not mounted on the ink jet recording apparatus, as shown in FIG. 6A, the sensor arm 31 is lowered, and accordingly, the photo-arm 32 is also lowered to offset or disengage from the photo-interrupter 33. In this condition, the photo-interrupter does not generate a signal (OFF-signal). When the waste ink tank 1 is mounted on the apparatus, the sensor arm 31 is rocked upwardly to a horizontal position by abutting against the flexible bag through the detecting window 27. Consequently, as shown in FIG. 6B, the photo-arm 32 is also brought to a horizontal position to engage with the photo-interrupter 33, thus energizing the latter to produce a signal (ON-signal). Next, when the waste ink tank 1 is filled with the waste ink, as mentioned above, the volume expanding member 34 expands upwardly to further lift the sensor arm 31 through the flexible bag 15. Consequently, as shown in FIG. 6C, the photo-arm 32 is also further rotated upwardly to disengage from the photo-interrupter 33, thus disenergizing the latter. In this case, the photo-interrupter does not generate a signal (OFF-signal). Indications on the basis of such ON-signal and OFF-signal are displayed on a control panel and the like.

As apparent from the above explanation, the OFF-signal from the photo-interrupter 33 indicates the fact that the waste ink tank 1 is not mounted on the ink jet recording apparatus or that the waste ink tank 1 has been filled with the waste ink. In any case, an operator must mount or dismount the waste ink tank 1 with respect to the apparatus.

Figure 7:
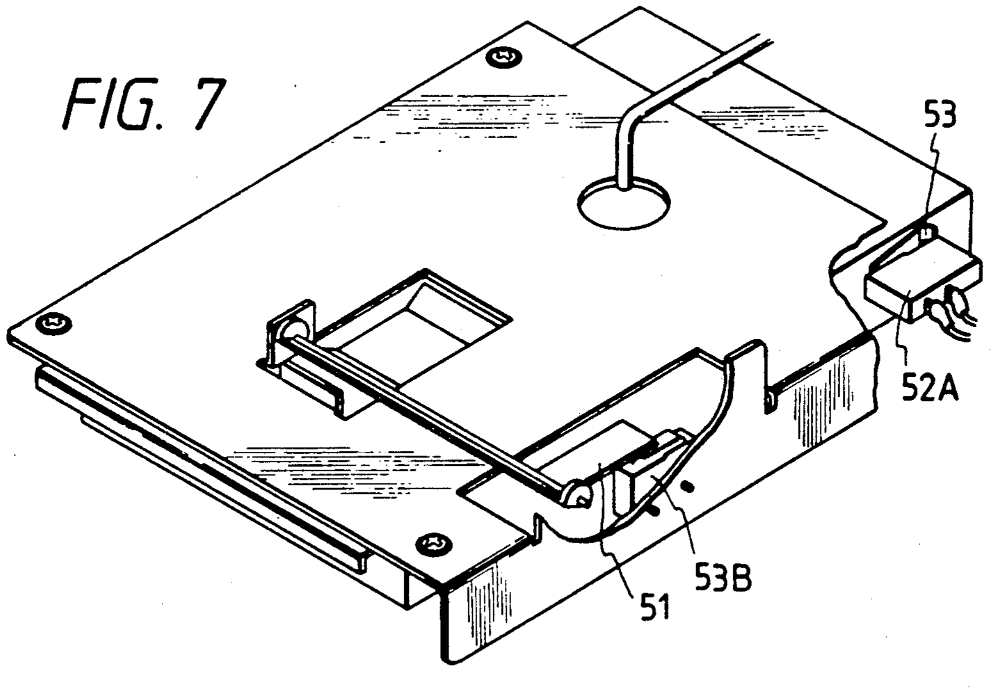
FIG. 7 is a schematic perspective view of a detecting mechanism for detecting an amount of ink according to another embodiment of the present invention.

As an example of another detecting mechanism for detecting an amount of ink, a detecting mechanism having two microswitches in place of the photo-interrupter will be explained with reference to FIG. 7.

When the waste ink tank 1 is not mounted on the ink jet recording apparatus, a microswitch 52A is in an OFF condition; whereas, a microswitch 52B is depressed by the weight of the sensor arm 31 and a rockable arm 51 to maintain an ON condition. When the waste ink tank 1 is mounted on the apparatus, the microswitch 52 will be in the ON condition due to rotation of an arm 53. When both of the microswitches 52A and 52B are in the ON condition, the waste tank permits the introduction of the waste ink therein. In this case, the ink jet recording apparatus can be used as a printer. When the volume expanding member 34 expands due to absorption of the waste ink to rotate the sensor arm 31 upwardly, the microswitch 52B is released from the rockable arm 51 (which is rotated upwardly together with the sensor arm 31) and will be in the OFF condition. The microswitches 52A and 52B are electrically connected so that, when either or both of the microswitches are in the OFF condition, the discharge restoring operation is stopped and the abnormality of the waste ink tank (missing of the tank or presence of the completely filled tank) is displayed on the control panel to indicate the fact that the operator must mount on the apparatus or replace the filled ink tank by a new empty one.

Next, a waste ink tank according to a second embodiment of the present invention will now be explained with reference to FIG. 8.

Figure 8:
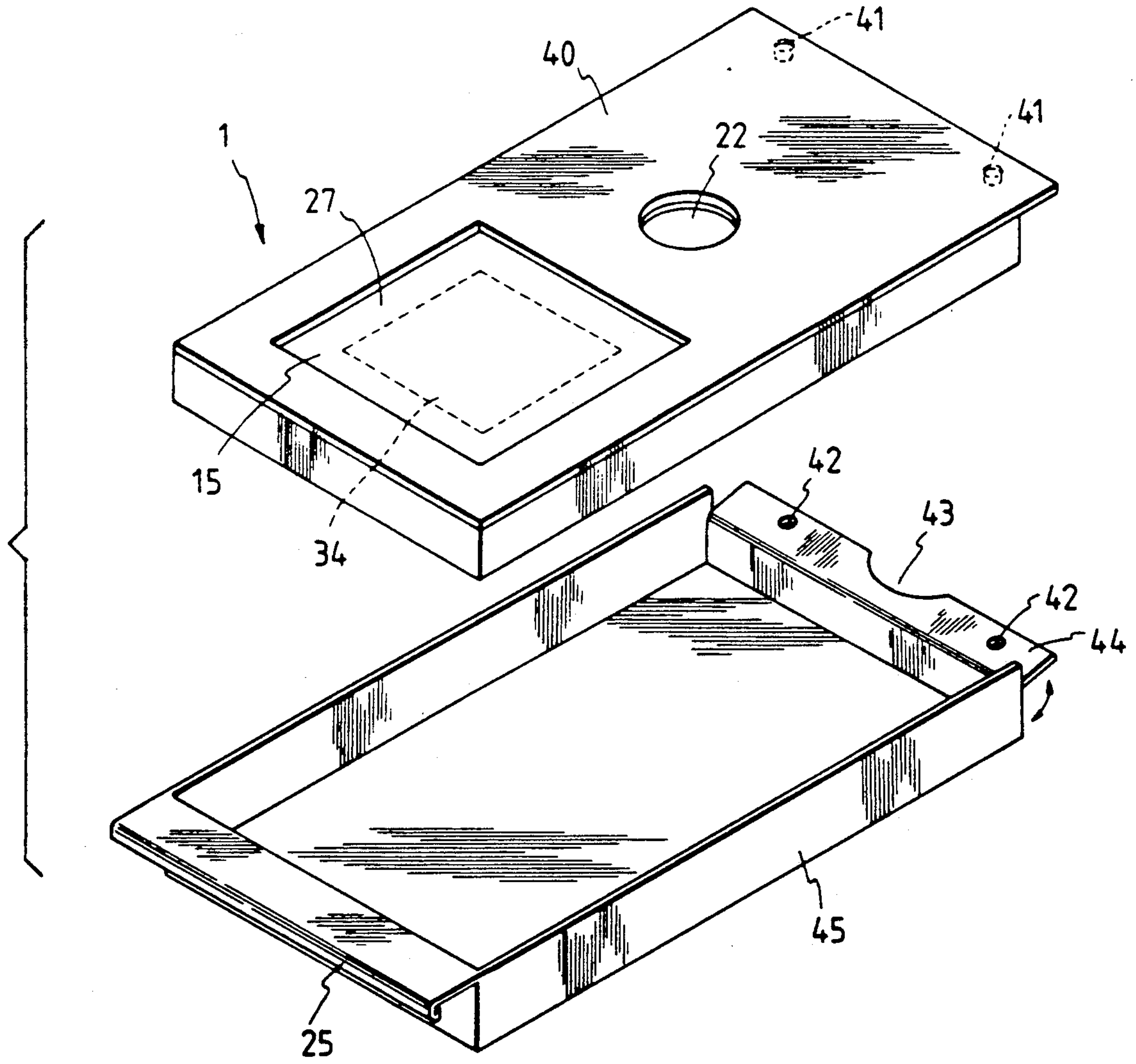
FIG. 8 is a schematic exploded perspective view showing an ink tank according to another embodiment of the present invention.

In this embodiment shown in FIG. 8, a fixing plate 40 forms a part of the waste ink tank 1 and is in the form of a flat plate. The fixing plate 40 has a detecting window 27 and a waste ink intake opening 22 formed therein. A bag-shaped sheet material is adhered or fixed to a circumference or a portion of the fixing plate 40 to constitute a flexible bag 15. Accordingly, the waste ink tank 1 is constituted by the fixing plate 40 and the flexible bag 15 covering the detecting window 27. In the waste ink tank, an ink absorbing member 16 having a volume substantially corresponding to that of the ink tank and a volume expanding member 34 attached to an upper surface of the ink absorbing member 16 in a confronting relation to the detecting window 27 are disposed. The fixing plate 40 further includes two fixing hooks 41.

A waste ink tray 45 is removably attached to the waste ink tank 1. The tray 45 has a handle portion 25 used in the mounting or dismounting operation of the ink tank with respect to the ink jet recording apparatus, and a attachment portion 44 having hook receiving holes 42. When the waste ink tank 1 is attached to the waste ink tray 45 by engaging the hooks 41 with the corresponding hook holes 42, since the attachment portion 44 of the tray are slightly inclined upwardly as shown, the fixing plate 40 attached to the attachment portion 44 of the tray urges the flexible bag 15 downwardly by a resilient force caused by the attachment portion 44, thereby determining the position and level of the volume expanding member 34 in the tank through the flexible bag 15.

The waste ink tank 1 and the waste ink tray 45 are removed from the ink jet recording apparatus, and thereafter, only the ink tank may be replaced; accordingly, during the mounting or dismounting operation of the ink tank, the contamination of the elements of the apparatus due to the waste ink is prevented effectively.

Of course, although not shown, a detecting mechanism for detecting an amount of ink (such as the sensor arm) is provided in the ink tank of FIG. 8.

Further, in the two embodiments mentioned above, since the ink detecting mechanism also acts as means for detecting the presence of the waste ink tank in the ink jet recording apparatus, the construction of the apparatus itself can be simplified. In addition, the operator can easily check the condition of the waste ink tank by means of the detecting mechanism, which facilitates the manipulation of the apparatus.

Incidentally, it should be noted that the detecting mechanism is not limited to the optical photo-interrupter, but may be constituted by the mechanical means wherein the microswitches are controlled by the movement of the sensor arm, as described above.

Lastly, a waste ink tank according to a third embodiment of the present invention will be explained with reference to FIGS. 9A and 9B.

Figure 9A:
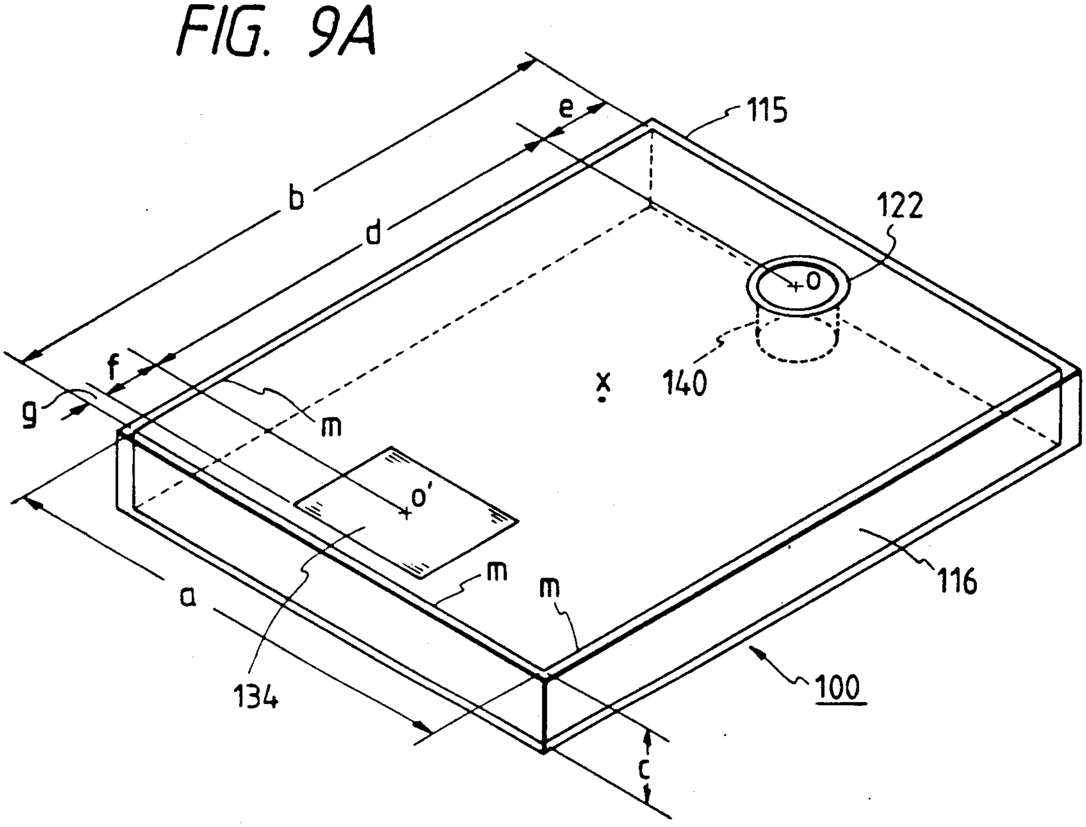
FIGS. 9A and 9B are schematic exploded perspective views showing an ink tank according to the other embodiment of the present invention.

As shown in FIG. 9A, a waste ink tank 100 is constituted by a flexible transparent sheet 115 enclosing an ink absorbing member 116 therein. The sheet 115 has a hole forming an ink intake opening 122, and a corresponding through hole 140 is formed in the ink absorbing member 116. By providing such through hole 140, penetration of ink (described later) can be generated to effectively collect the waste ink.

In this embodiment, preferably, the ink absorbing member has high ink holding capacity and does not swell or expand so much; for example, in the embodiment, a laminated sheet "HATOSHEET" (registered trademark) sold by Honshu Seishi K. K. in Japan was used as the ink absorbing member which has a width a of 60–100 mm, a length b of 100–150 mm and a thickness of 8–15 mm.

A volume expanding member 134 is arranged between the ink absorbing member 116 and the sheet 115, opposed to the ink intake opening 122 with respect to a center X of the waste ink tank. The volume expanding member 134 has its center designated by 0'.

The volume expanding member 134 is preferably made of water-absorbing polymer, and in particular, is made of material which can swell until the weight thereof (when absorbes the ink) increases up to a value more than the original weight by 8-600 times. In this embodiment, a material "SUMIKAGEL" (registered trademark) sold by Sumitomo Kagaku Kogyo K. K. in Japan was used as the volume expanding member.

Figure 9B:
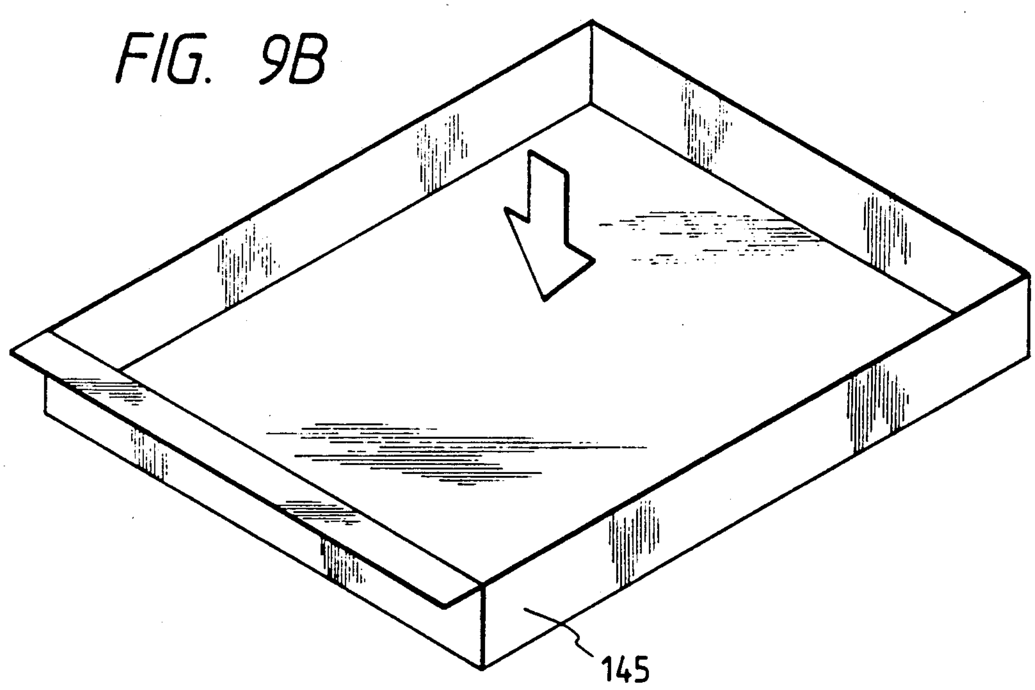

The waste ink tank is inserted into a tray 145 shown in FIG. 9B from a direction indicated by an arrow and is mounted together with the tray onto the ink jet recording apparatus as mentioned above.

FIGS. 10A-10D show the state of the penetration of ink into the waste ink tank progressing or growing with time.

Figure 10A:
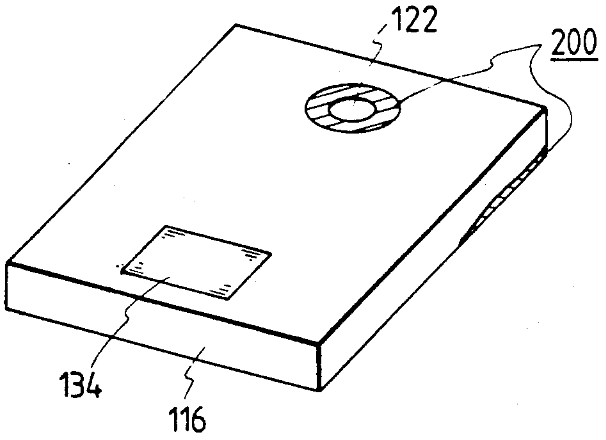
FIGS. 10A, 10B, 10C and 10D are schematic perspective views showing the state of penetration of ink in the waste ink tank shown in FIGS. 9A and 9B.
Figure 10B:
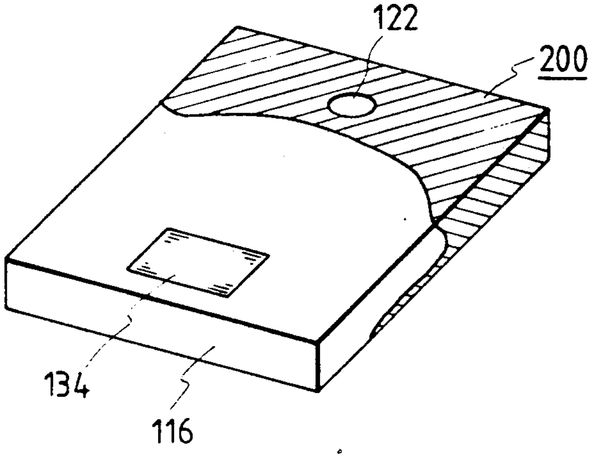
Figure 10C:
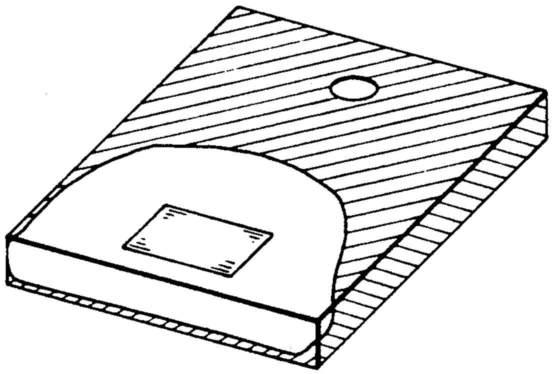
Figure 10D:
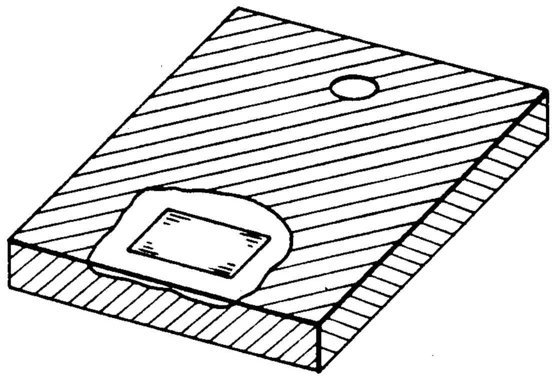

As shown in FIG. 10A, the waste ink dropped to the bottom of the ink tank through the ink intake opening 122 spreads along the lowermost layer of the ink absorbing member 116 and also penetrates into the ink absorbing member around the intake opening 122. Thereafter, the penetration of the ink grows or progresses gradually as shown from FIG. 10B to FIG. 10D.

As mentioned above, in order to use the ink absorbing member 116 effectively, it is desirable to absorb the ink by the volume expanding member 134 after the ink has been absorbed by the ink absorbing member 116 substantially up to its maximum ink-absorbing capacity.

To this end, a distance between the center 0 of the intake opening 122 and the center 0' of the volume expanding member 134, i.e., a distance d (FIG. 9A) is so selected to be larger than b/2 and the centers 0, 0' are opposed to each other with respect to the center X of the waste ink tank.

Further, the volume expanding member 134 is arranged so that the peripheral edge of the volume expanding member is not contacted with edges m of the sheet 115 enclosing the ink absorbing member (for example, $g>0$, refer to FIG. 9A).

Particularly, in this embodiment, when the elements of the ink tank are arranged according to a range $e/b \leqq 1/6$ and $(g+f)/b \geqq 1/7$, a desirable result was obtained. In this case, the detecting mechanism is activated when the ink absorbing member absorbs the amount of ink of 50%-90% (volume ratio) of the maximum ink absorbing capacity thereof, because, in the above range, the leakage of the ink is prevented since the ink absorbing member is effectively used to maintain the ink holding capacity thereof in that range. The above value (50%-90%) can be selected by appropriately determining the above dimensions (a, b, c, . . . ).

As mentioned above, according to the present invention, the ink absorbing member has high ink-absorbing capacity, and, preferably has extremely low coefficient of volumetric expansion; whereas, the volume expanding member preferably swells by a few times to a few hundred times, as described above.

In this way, a water-absorbing polymer such as urethane foam and the like can be as the above-mentioned volume expanding member.

As apparent from the foregoing explanation, according to the present invention, it is possible to detect a predetermined amount of ink in the waste ink tank by detecting the change in volume of the volume expanding member. Consequently, the present invention provides an ink jet recording apparatus which is relatively cheap and can absorb the ink effectively and has a detecting mechanism for properly detecting the amount of ink.

I claim:

1. A container for containing liquid, comprising:

ink containing means for containing the liquid, said containing means defining an ink introducing section;

a liquid absorbing member disposed in said ink containing means and receiving liquid through the opening; and a volume expanding member contacting said liquid absorbing member at a predetermined portion thereof, with said volume expanding member expanding due to absorption of the liquid and having a coefficient of volumetric expansion higher than that of said liquid absorbing member.

2. A container according to claim 1, further including detecting means for detecting displacement of the volume of said volume expanding member, with said detecting means being arranged in association with said volume expanding member.

3. A container according to claim 2, wherein said detecting means includes a photo-sensor for optically detecting the displacement.

4. A container according to claim 2, wherein said detecting means includes a switch for manually detecting the displacement.

5. A container according to claim 1, wherein said ink containing means comprises a flexible film, and said volume expanding member is disposed between said liquid absorbing member and said flexible film.

6. A container according to claim 1, wherein said volume expanding member contacts said liquid absorbing member at a portion substantially opposite from said ink introducing section through which said liquid absorbing member receives liquid.

7. A container according to claim 1, wherein said liquid absorbing member comprises a laminated sheet.

8. A container according to claim 1, wherein said volume expanding member includes material having an original weight which can be increased by at least eight times due to absorption of the liquid.

9. A container according to claim 8, wherein said volume expanding member includes a liquid-absorbing polymer.

10. A waste ink tank for containing waste ink in an ink jet recording apparatus, comprising:

waste ink containing means for containing the ink, said containing means defining an opening through which liquid is received;

an ink absorbing member disposed in said waste ink containing means and receiving ink through the opening; and a volume expanding member contacting said ink absorbing member at a predetermined position thereof, with said volume expanding member expanding due to absorption of ink and having a coefficient of volumetric expansion higher than that of said ink absorbing member.

11. A waste ink tank according to claim 10, further including detecting means for detecting displacement of the volume of said volume expanding member, with said detecting means being arranged in association with said volume expanding member.

12. A waste ink tank according to claim 11, wherein said detecting means includes a photo-sensor for optically detecting the displacement.

13. A waste ink tank according to claim 11, wherein said detecting means includes a switch for manually detecting the displacement.

14. A waste ink tank according to claim 10, wherein said ink containing means comprises a flexible film, and said volume expanding member is disposed between said ink absorbing member and said flexible film.

15. A waste ink tank according to claim 10, wherein said volume expanding member contacts said liquid absorbing member at a portion substantially opposite from the opening through which said liquid absorbing member receives liquid.

16. A waste ink tank according to claim 10, wherein said ink absorbing member comprises a laminated sheet.

17. A waste ink tank according to claim 10, wherein said volume expanding member includes having an original weight which can be increased by at least eight times due to absorption of the ink.

18. A waste ink tank according to claim 17, wherein said volume expanding member includes a liquid-absorbing polymer.

19. A waste ink tank according to claim 10, wherein said ink absorbing member has a substantially rectangular shape with a length of b, and said volume expanding member is arranged such that $d > \frac{1}{2} \cdot b$, with d defining a distance between a center of the opening and a center of said volume expanding member.

20. A waste ink tank according to claim 19, wherein said volume expanding member is disposed so as not to contact peripheral portions of said waste ink containing means.

21. A waste ink tank according to claim 19, wherein a distance between the center of said volume expanding member and a nearest end of said waste ink tank means is y, and said waste ink containing means satisfies the relation $7y \leqq b$.

22. A waste ink tank according to claim 21, wherein a distance between the center of the opening and a nearest end of said containing means is e, and said waste ink containing means satisfies the relation $6e \geqq b$.

23. A waste ink tank according to claim 10, wherein said detecting means is activated when said volume expanding member absorbs ink more than 50%, by volume, of its maximum ink-absorbing capacity thereof.

24. An ink jet recording apparatus comprising:

at least one recording head having a discharge opening for discharging ink;

a supply system for supplying ink to said recording head;

waste ink receiving means for containing waste ink from said recording head and/or said supply system, comprising waste ink containing means for containing the ink, said containing means having an ink receiving section for receiving the waste ink, an ink absorbing member disposed in said waste ink containing means, and a volume expanding member contacting said ink absorbing member at a predetermined position thereof, with said volume expanding member expanding due to absorption of the ink and having a coefficient of volumetric expansion higher than that of said ink absorbing member; and detecting means, provided in association with said volume expanding member, for detecting displacement of the volume of said volume expanding member.

25. An ink jet recording apparatus according to claim 24, wherein said detecting means includes a photo-sensor for optically detecting the displacement.

26. An ink jet recording apparatus according to claim 24, wherein said detecting means includes a switch for manually detecting the displacement.

27. An ink jet recording apparatus according to claim 24, wherein said ink containing means comprises a flexible film, and said volume expanding member is disposed between said ink absorbing member and said flexible film.

28. An ink jet recording apparatus according to claim 24, wherein said volume expanding member contacts said liquid absorbing member at a portion substantially opposite from said ink introducing section through which said liquid absorbing member receives liquid.

29. An ink jet recording apparatus according to claim 24, wherein said ink absorbing member comprises a laminated sheet.

30. An ink jet recording apparatus according to claim 24, wherein said volume expanding member includes material which can increase its original weight by at least eight times due to absorption of the ink.

31. An ink jet recording apparatus according to claim 30, wherein said volume expanding member includes a liquid-absorbing polymer.

32. An ink jet recording apparatus according to claim 24, wherein said ink absorbing member has a substantially rectangular shape with a length of b, and said volume expanding member is arranged such that $d > \frac{1}{2} \cdot b$, with d defining a distance between a center of the opening and a center of said volume expanding member.

33. An ink jet recording apparatus according to claim 32, wherein said volume expanding member is disposed so as not to contact peripheral portions of said waste ink containing means.

34. An ink jet recording apparatus according to claim 32, wherein a distance between the center of said volume expanding member and a nearest end of said containing means is y, and said waste ink containing means satisfies the relation $7y \leqq b$.

35. An ink jet recording apparatus according to claim 34, wherein a distance between the center of said ink receiving section and a nearest end of said waste ink containing means is e, and said waste ink containing means satisfies the relation $6e \leqq b$.

36. An ink jet recording apparatus according to claim 24, wherein said detecting means is activated when said volume expanding member absorbs ink more than 50%, by volume, of a maximum ink-absorbing capacity thereof.

37. An ink jet recording apparatus according to claim 24, wherein said waste ink tank can be mounted at the bottom of the ink jet recording apparatus.

38. An ink jet recording apparatus according to claim 24, further comprising discharge restoring means for obtaining waste ink, wherein the waste ink is exhausted from said discharge restoring means.

39. An ink jet recording apparatus according to claim 38, wherein said discharge restoring means is deactivated when a signal indicating that the ink in said waste ink containing means has reached a predetermined amount.

40. An ink jet recording apparatus comprising:

discharge recovery means for exhausting ink from a discharge port of a recording head;

waste ink receiving means for receiving ink exhausted by said discharge recovery means, said waste ink receiving means comprising waste ink containing means for containing the ink, said containing means having an opening for receiving the waste ink, an ink absorbing member disposed in said waste ink containing means, and a volume expanding member contacting said ink absorbing member at a predetermined position thereof, with said volume expanding member expanding due to absorption of the ink and having a coefficient of volumetric expansion higher than that of said ink absorbing member; and detecting means, provided in association with said volume expanding member, for detecting displacement of the volume of said volume expanding member.

41. An ink jet recording apparatus for recording by discharging ink on a recording medium, comprising:

a conveying member for conveying the recording medium to a recording position opposed to a recording head;

a driving system for scanning a carriage carrying the recording head between the recording position and a second position, apart from the recording position, where a cap member is disposed; and a waste ink tank for storing waste ink exhausted at a recovery operation performed to recover discharge of the recording head by contacting the cap member and the recording head, wherein said waste ink tank has a waste ink containing member for containing ink, said containing member including an opening for receiving the waste ink, and ink absorbing member disposed in said waste ink containing member and a volume expanding member contacting said ink absorbing member at a predetermined position thereof, with said volume expanding member expanding due to absorption of ink and having a coefficient of volumetric expansion higher than that of said ink absorbing member, and a detector provided in association with said volume expanding member for detecting displacement of the volume of said volume expanding member.

42. An ink jet recording apparatus according to claim 41, further comprising a second detector for detecting a mounting state of said waste ink tank to the apparatus, said second detector comprising a photointerruptor or a microswitch.

43. An ink jet recording apparatus according to claim 41, wherein the recording head can discharge ink when said detector detects mounting of said waste ink tank to the apparatus.

* * * * *

UNITED STATES PATENT AND TRADEMARK OFFICE

CERTIFICATE OF CORRECTION

PATENT NO. : 5,113,206

DATED : May 12, 1992

INVENTOR(S) : HIDEO FUKAZAWA

It is certified that error appears in the above-identified patent and that said Letters Patent is hereby corrected as shown below:

ON THE TITLE PAGE:

IN [63] RELATED U.S. APPLICATION DATA

"Dec. 29, 1989," should read --Dec. 29, 1988,--.

COLUMN 1

Line 6, "Dec. 29, 1989," should read --Dec. 29, 1988,--.
Line 56, "apparatus 12" should read --apparatus 10--.

COLUMN 2

Line 28, "mounted" should read --was mounted--.
Line 44, "engage" should read --engages--.
Line 51, "is" should read --are--.

COLUMN 3

Line 55, "as any forms" should read --in any form--.
Line 66, "constructural" should read --constructional--.

COLUMN 4

Line 39, "hight" should read --height--.
Line 60, "spreaded" should read --spread--.

COLUMN 6

Line 14, "a" should read --an--.
Line 64, "thickness" should read --thickness c--.

UNITED STATES PATENT AND TRADEMARK OFFICE

CERTIFICATE OF CORRECTION

PATENT NO. : 5,113,206

DATED : May 12, 1992

INVENTOR(S) : HIDEO FUKAZAWA

It is certified that error appears in the above-identified patent and that said Letters Patent is hereby corrected as shown below:

COLUMN 7

Line 6, "absorbes" should read --it absorbs--.
Line 61, "can be" should read --can be used--.

COLUMN 8

Line 8, "tion;" should read --tion with an opening;--.

COLUMN 9

Line 16, "includes having" should read --includes material having--.
Line 35, "waste ink tank means" should read --waste ink containing means--.
Line 45, "thereof" should be deleted.

COLUMN 10

Line 54, "waste ink tank" should read --waste ink receiving means--.

UNITED STATES PATENT AND TRADEMARK OFFICE

CERTIFICATE OF CORRECTION

PATENT NO. : 5,113,206

DATED : May 12, 1992

INVENTOR(S) : HIDEO FUKAZAWA

It is certified that error appears in the above-identified patent and that said Letters Patent is hereby corrected as shown below:

COLUMN 12

Line 7, "and" should read --an--.

Signed and Sealed this

Thirty-first Day of August, 1993

Attest:

BRUCE LEHMAN

Attesting Officer

Commissioner of Patents and Trademarks